United States Patent [19]
Kasaki

[11] Patent Number: 5,841,429
[45] Date of Patent: Nov. 24, 1998

[54] METHOD AND APPARATUS FOR MANAGING A CHARACTER PATTERN

[75] Inventor: Nobuhiro Kasaki, Niigata, Japan

[73] Assignee: NEC Corporation, Tokyo, Japan

[21] Appl. No.: 653,697

[22] Filed: May 23, 1996

[30] Foreign Application Priority Data

May 23, 1995 [JP] Japan .................................. 7-123530

[51] Int. Cl.$^6$ ........................................................ G06F 3/12
[52] U.S. Cl. ........................................... 345/192; 395/110
[58] Field of Search .................................. 345/192, 467, 345/471, 194, 195; 395/110

[56] References Cited

U.S. PATENT DOCUMENTS 5,042,075  8/1991  Sato ........................................ 345/471
5,107,259  4/1992  Weitzen et al. ......................... 345/471

Primary Examiner—Mark K. Zimmerman
Attorney, Agent, or Firm—Young & Thompson

[57] ABSTRACT

A controller section registers a character pattern and individual information thereof in a buffer memory. The individual information includes a first flag indicating a first processing state and a character code assigned to the character pattern. The controller detects the individual information of a character pattern previously stored in the buffer memory. Further, the controller section stores a new character pattern by overwriting the previously-stored character pattern according to the detected individual information of the previously-stored character pattern.

9 Claims, 4 Drawing Sheets

METHOD AND APPARATUS FOR MANAGING A CHARACTER PATTERN

BACKGROUND OF THE INVENTION

1. Field of the Invention

The present invention relates to a method and apparatus for managing a character pattern, and, more particularly, to a method and apparatus for managing a character pattern applied to an image outputting apparatus such as a printer capable of outputting a character pattern such as an external character designated from a high-order unit.

2. Description of the Related Art

As printed output from computers becomes more variable, a character pattern such as an external character designated from a high-order unit is normally output from an image outputting apparatus such as a printer. The character pattern is stored and managed in a memory resident in the printer. It is important to efficiently use the printer memory to increase the processing speed of the printer.

A conventional image outputting apparatus is disclosed in Japanese Laid-Open Patent Application No.2-301464. The conventional apparatus has a memory for previously storing font data whose frequency of use is high, and storing the character pattern designated from a host computer. In the memory, the font cache area wherein the font data is stored, is reduced so as to increase the memory area wherein the character pattern is stored. That is, the memory area wherein the character pattern is stored can be dynamically acquired in the memory by controlling the font cache area.

SUMMARY OF THE INVENTION

It is an object the present invention to provide a method and apparatus for managing a character pattern capable of efficiently using a memory wherein the character pattern is stored.

To achieve the above object, the apparatus for managing a character pattern comprises means for storing a character pattern and individual information thereof. The "individual information" includes a first flag indicating a first state wherein the character pattern is referred and a character code being assigned to the character pattern. Further, the apparatus comprises means for detecting the individual information of a character pattern which is previously stored and means for storing the character pattern in the storing means according to the detected individual information.

The invention also resides in a method for managing a character pattern comprising the steps of storing a character pattern and individual information thereof, the individual information including a first flag indicating a first state wherein the character pattern is referred and a character code being assigned to the character pattern, and detecting the individual information of a character pattern which is previously stored. Further, the storing step stores the character pattern by overwriting the character pattern at an area wherein the a stored character pattern has been previously written according to the detected individual information of the stored character pattern.

BRIEF DESCRIPTION OF THE DRAWINGS

The above and other objects, features and advantages of the present invention will become more apparent from the following description taken in conjunction with the accompanying drawings, wherein.

DETAILED DESCRIPTION OF THE PREFERRED EMBODIMENT

Figure 1:
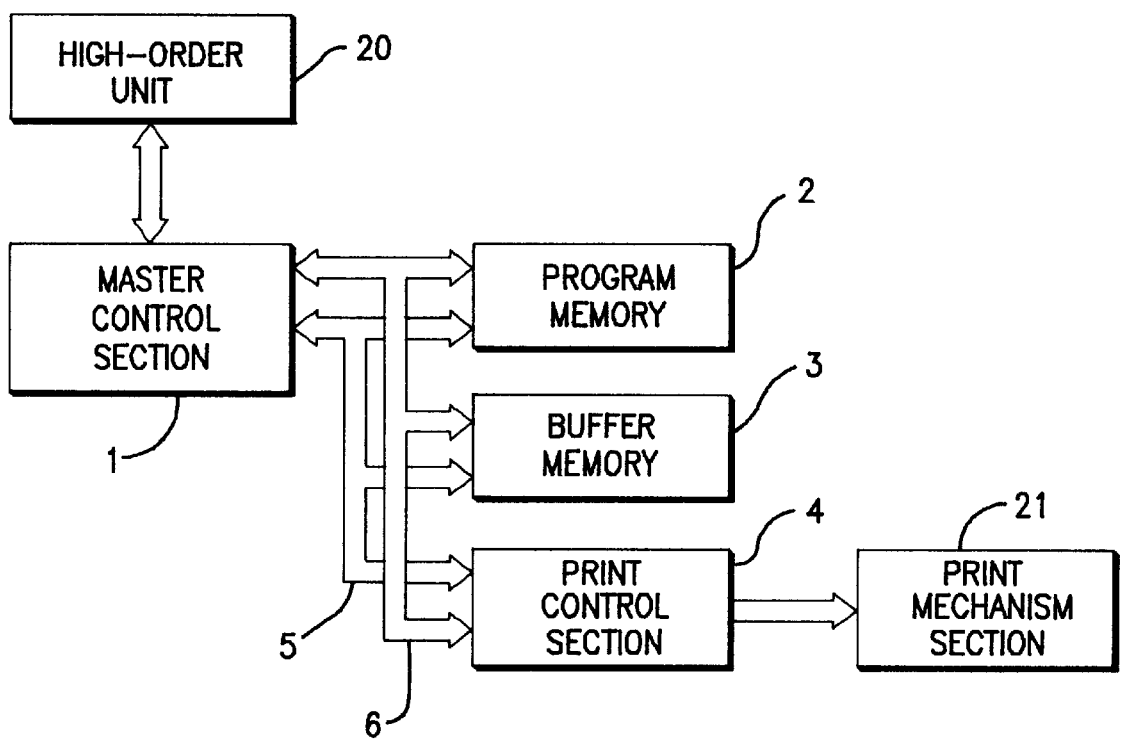
FIG. 1 is a block diagram showing a printer according to an embodiment of the present invention.

Referring to FIG. 1, a master control section 1 controls the entire printer and stores a character pattern such as an external character designated from a high-order unit 20 such as a computer. The master control section 1 is constituted by a central processing unit (CPU) which operates according to a control program written to a program memory 2 and controls each component of the printer via an address bus 5 and a data bus 6. The program memory 2 is embodied as a read only memory (ROM), and incorporates a microprogram for controlling the entire printer and a program for storing the character pattern, and outputs control data for controlling the printer to the data bus 6 based on a microprogram command which is output through the address bus 5 from the master control section 1. A buffer memory 3 is embodied as a random access memory (RAM), and stores the character pattern during the execution of the storage processing program for the character pattern and some other temporary process data. A print control section 4 receives print data through the data bus 6 and transmits the print data to a print mechanism section 21. The print mechanism section 21 performs printing according to the print data.

Next, the method for managing the character pattern stored in the buffer memory will be described with reference to FIGS. 2A and 2B.

Figures 2A, 2B:
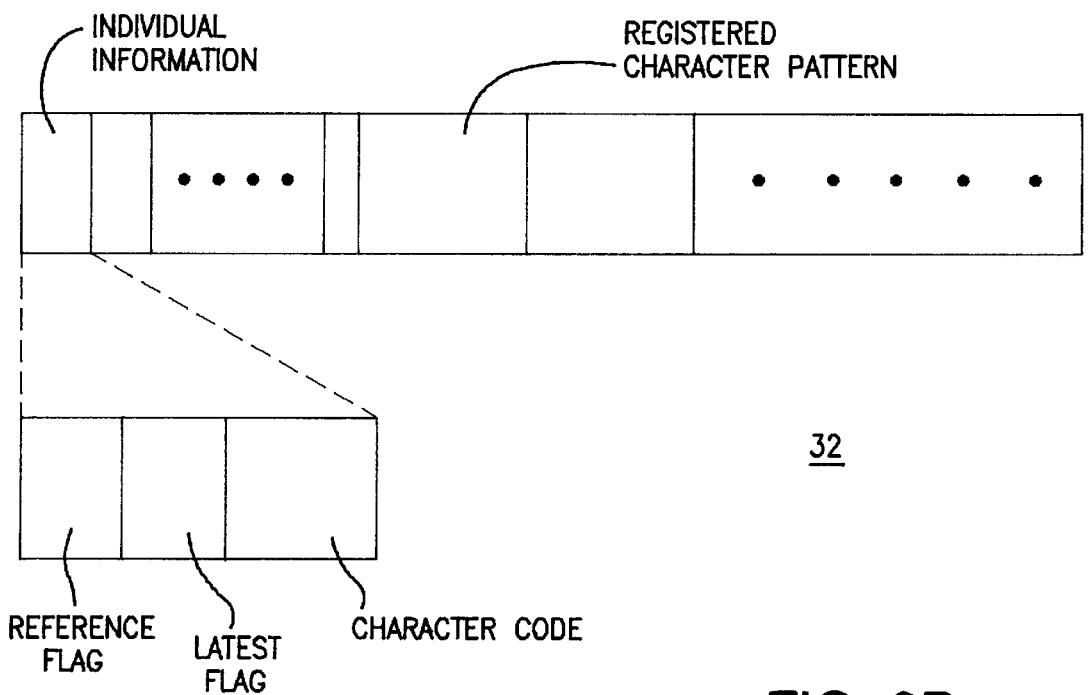
FIG. 2A is a diagram showing a managing table.
FIG. 2B is a diagram showing a managing block.

The character pattern designated from the high-order unit 20 and information thereof are managed by using a managing table 31 shown in FIG. 2A and a managing block 32 shown in FIG. 2B in the buffer memory 3. The managing block 32 manages at least one registered character pattern and individual information thereof. The individual information includes a character code assigned to the stored character pattern and a reference flag which is in an ON-state when the stored character pattern is referred by at least one module and is in an OFF-state when the stored character pattern is not referred. Further, the individual information includes a latest flag which is in an ON-state when the stored character pattern is the latest stored character pattern of the stored character pattern having the same character code. The managing block 32 is dynamically acquired in the buffer memory 3. That is, when there is no character pattern to be stored, none of the managing block 32 is acquired in the buffer memory 3. On the other hand, when many character patterns are stored, a corresponding number of managing blocks 32 are acquired in the buffer memory 3.

The managing table 31 manages the header address of the acquired managing block 32 and the number of the character patterns registered in the managing block 32. The managing table 31 is statically acquired in the buffer memory 3.

Figure 3:
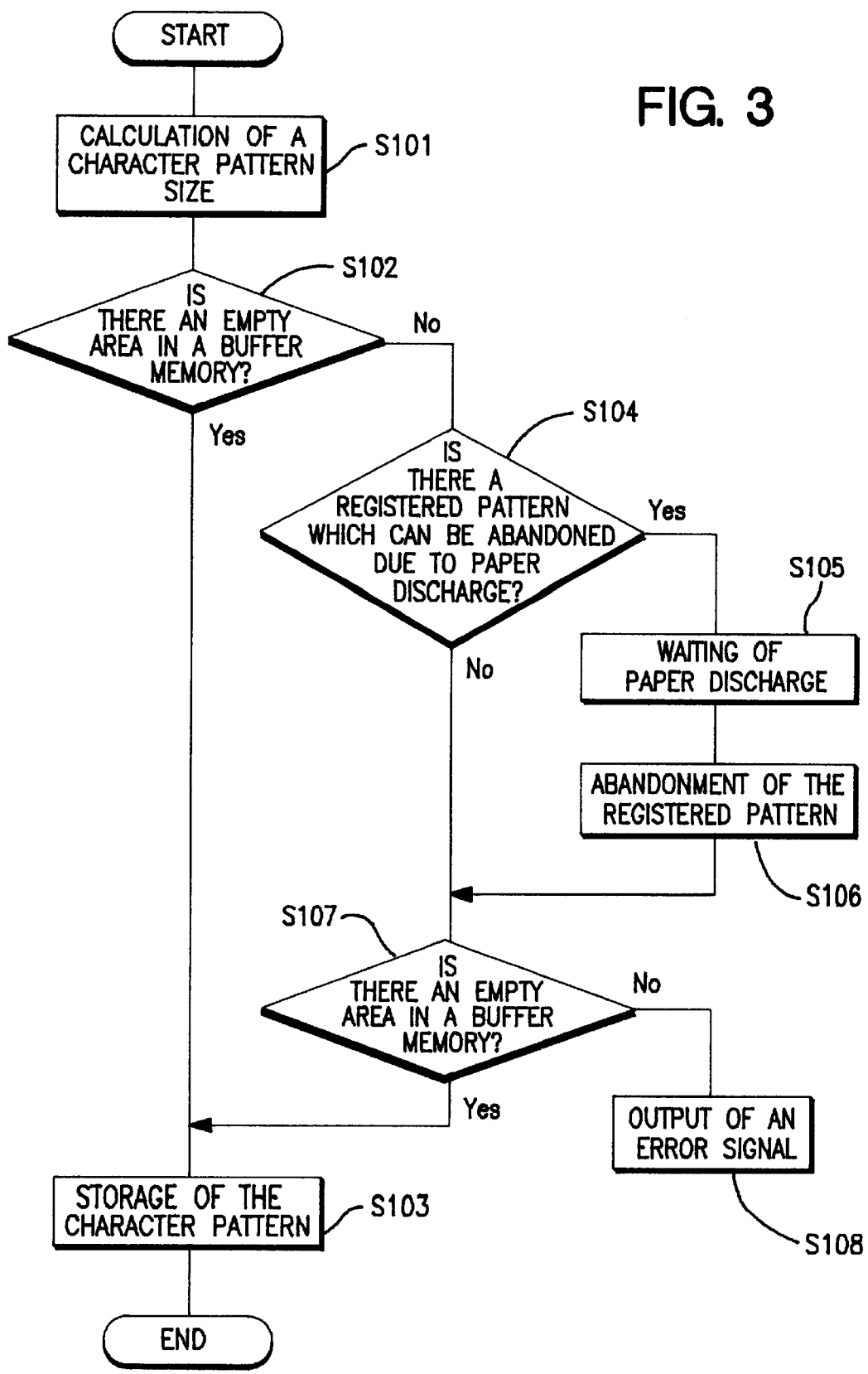
FIG. 3 is a flow chart showing an operation of the embodiment of the present invention.

Next, the method for storing the character pattern designated from the high-order unit to the buffer memory will be described with reference to FIG. 3.

When a pattern storage process command for storing the character pattern is received from the high-order unit 20, the size of the character pattern to be stored is calculated (S101). Then, it is judged whether an area for storing the character pattern can be acquired in the buffer memory 3 (S102). That is, it is judged whether a managing block 32 capable of storing the character pattern is available in the buffer memory 3, or whether new managing block 32 can be acquired in the buffer memory 3. If sufficient memory can be acquired, then the character pattern is stored in an empty area of the buffer memory 3 (S103). That is, the character pattern is stored in the managing block with the individual information. On the other hand, when sufficient memory cannot be acquired in the buffer memory 3, it is judged whether there are stored character patterns which can be abandoned upon paper discharge corresponding to printing a previous page (S104). Here, stored character patterns having individual information wherein both of the latest flag and the reference flag are in the OFF-state, can be abandoned. When such patterns exist, the registered character patterns are abandoned (S106) after waiting for paper discharge corresponding to printing a previous page is performed (S105). If all stored patterns in a managing block 32 can be abandoned, the managing block 32 is released. Then, it is judged again whether the area for storing the character pattern can be acquired in the buffer memory 3 (S107), after the stored character patterns are abandoned. When the area can be acquired, the character pattern is stored in an empty area of the buffer memory 3 (S103). On the other hand, when the area cannot be acquired, an error signal is output to the high-order unit 20 (S108).

As has been described above, the buffer memory can be efficiently used, because unnecessary stored patterns are abandoned according to the states of both the latest flag and the reference flag which are managed in the managing block.

Figure 4:
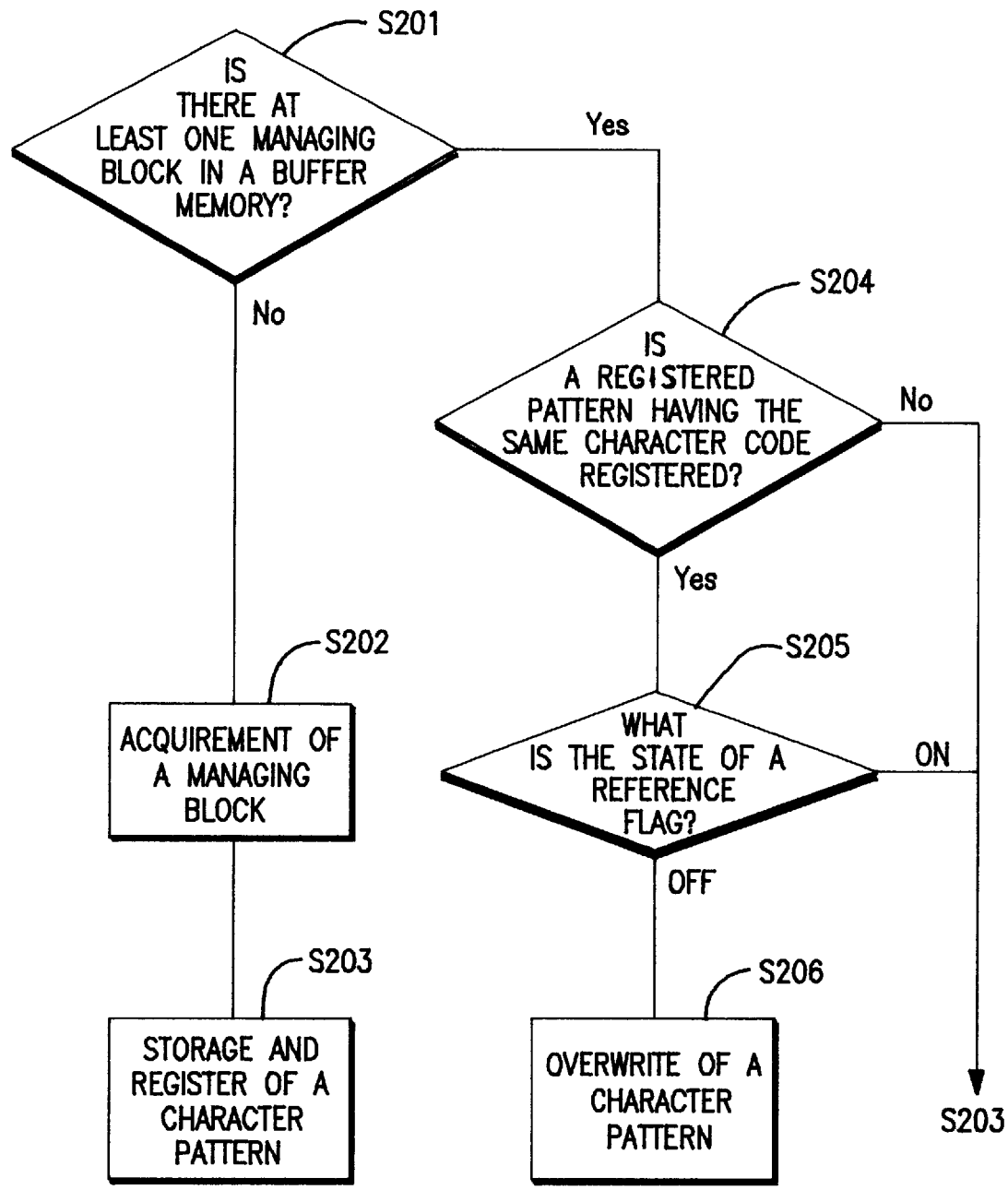
FIG. 4 is a flow chart showing an operation of the embodiment of the present invention.

Next, the operation of the step S103 in FIG. 3 will be described in detail with reference to FIG. 4.

When the command for registering a character pattern is transmitted from the high-order unit 20, it is judged whether at least one managing block 32 is acquired (S201). When no managing block 32 is acquired, the first managing block 32 is acquired in the buffer memory 3 (S202), and the character pattern is stored in an empty area of the acquired managing block 32 (S203). On the other hand, when at least one managing block 32 is already acquired, it is judged whether the character pattern having the same character code as that of a character pattern designated from the high-order unit 20 is already stored (S204). When no such character pattern exists in the managing block 32, the new character pattern is stored in an empty area of the managing block (S203). On the other hand, when such a character pattern exists in the managing block 32, the state of the reference flag of the stored character pattern is detected (S205). When the reference flag is in the OFF-state, the new character pattern to be stored is overwritten at the area wherein the old character pattern was stored (S206). On the other hand, when the reference flag is in the ON-state, the new character pattern to be stored is stored in the empty area of the managing block 32 (S203).

In accordance with the aforementioned embodiment of the present invention, the character pattern is overwritten at the area wherein an old character pattern is stored and the unnecessary stored patterns are abandoned according to the individual information including the reference flag, the latest flag and the character code. Therefore, the buffer memory can be used efficiently and the printer can be controlled to run at high speed.

While the invention has been described with reference to a preferred embodiment thereof, the invention is not to be limited to the details given herein, but may be modified within the scope of the appended claims.

What is claimed is:

1. An apparatus for managing a character pattern, comprising:

means for storing a character pattern and individual information thereof, said individual information including a first flag indicating a first processing state of said character pattern and a character code assigned to said character pattern;

means for detecting said individual information of a previously stored said character pattern; and means for storing a new said character pattern in said storing means according to said detected individual information.

2. The apparatus as claimed in claim 1, wherein said individual information further includes a second flag indicating a second state wherein said character pattern is a latest pattern of a previously-stored said character pattern having a same character code.

3. The apparatus as claimed in claim 2, further comprising:

means for abandoning said previously-stored character pattern when said previously-stored character pattern is no longer in said first or second states.

4. The apparatus as claimed in claim 1, wherein said storing means is constituted by a random access memory.

5. The apparatus as claimed in claim 1, wherein said means for storing a new said character pattern stores said character pattern by overwriting an old said character pattern when said old character pattern is no longer in said first state and said old character pattern has a same character code as that of said new character pattern.

6. A method for managing a character pattern, comprising the steps of:

storing a character pattern and individual information thereof, said individual information including a first flag indicating a first processing state of said character pattern and a character code assigned to said character pattern;

detecting said individual information of a previously-stored character pattern, and storing a new said character pattern by overwriting said previously-stored character pattern according to said detected individual information of said previously-stored character pattern.

7. The method as claimed in claim 6, wherein said step of storing a new character pattern overwrites said previously-stored character pattern when said previously-stored character pattern is not in said first state and said previously-stored character pattern has a character code matching that of said new character pattern.

8. The method as claimed in claim 6, wherein said individual information further includes a second flag indicating a second state wherein said character pattern is a latest pattern of a previously-stored said character pattern having a same character code.

9. The method as claimed in claim 8, further comprising the step of:

abandoning said previously-stored character pattern when said previously-stored character pattern is no longer in said first or second states.

* * * * *